United States Patent
Gubrinski et al.

(10) Patent No.: US 11,634,325 B2
(45) Date of Patent: Apr. 25, 2023

(54) ABSORBER COLUMN AND PROCESS FOR CLEANING CRUDE SYNTHESIS GAS

(71) Applicant: L'Air Liquide, Société Anonyme pour l'Etude et l'Exploitation des Procédés Georges Claude, Paris (FR)

(72) Inventors: Alfred Gubrinski, Erzhausen (DE); Sandra Jensen, Frankfurt am Main (DE); Sharon Corbet, Frankfurt (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 347 days.

(21) Appl. No.: 16/955,964

(22) PCT Filed: Dec. 10, 2018

(86) PCT No.: PCT/EP2018/025312
§ 371 (c)(1),
(2) Date: Jun. 19, 2020

(87) PCT Pub. No.: WO2019/120616
PCT Pub. Date: Jun. 27, 2019

(65) Prior Publication Data
US 2020/0339418 A1 Oct. 29, 2020

(30) Foreign Application Priority Data

Dec. 22, 2017 (EP) ..................... 17400071

(51) Int. Cl.
*B01D 53/14* (2006.01)
*B01D 53/18* (2006.01)
*C01B 3/56* (2006.01)

(52) U.S. Cl.
CPC ............ *C01B 3/56* (2013.01); *B01D 53/1406* (2013.01); *B01D 53/1412* (2013.01);
(Continued)

(58) Field of Classification Search
CPC ............... C01B 3/56; C01B 2203/042; C01B 2203/0475; C01B 2203/0485;
(Continued)

(56) References Cited

U.S. PATENT DOCUMENTS

| 4,460,385 A | 7/1984 | Pan et al. |
| 2009/0241773 A1 | 10/2009 | Lechnick et al. |

(Continued)

FOREIGN PATENT DOCUMENTS

| EP | 2 179 777 | 4/2010 |
| EP | 2 665 543 | 11/2013 |
| WO | WO 2009 158064 | 12/2009 |

OTHER PUBLICATIONS

Ullmann's Encyclopedia of Industrial Chemistry, 6th Ed. vol. 15, 399-407.

(Continued)

*Primary Examiner* — Anita Nassiri-Motlagh
(74) *Attorney, Agent, or Firm* — Elwood L. Haynes

(57) ABSTRACT

The invention relates to an absorber column and to the use thereof for separation of unwanted, especially acidic, gas constituents, for example carbon dioxide and hydrogen sulfide, from a crude synthesis gas by absorption with an absorbent, especially under low load states of the absorber column in relation to the synthesis gas velocity. According to the invention, a defined concentration of carbon dioxide in the clean synthesis gas is established by mixing at least a portion of the absorbent regenerated by flash regeneration with the absorbent regenerated by means of hot regeneration prior to the recycling thereof into the absorber column.

11 Claims, 1 Drawing Sheet

(52) U.S. Cl.
CPC ..... *B01D 53/1425* (2013.01); *B01D 53/1468* (2013.01); *B01D 53/1475* (2013.01); *B01D 53/1493* (2013.01); *B01D 53/185* (2013.01); *B01D 2252/2021* (2013.01); *C01B 2203/042* (2013.01); *C01B 2203/0475* (2013.01); *C01B 2203/0485* (2013.01); *C01B 2203/061* (2013.01)

(58) Field of Classification Search
CPC .......... C01B 2203/061; B01D 53/1406; B01D 53/1412; B01D 53/1425; B01D 53/1468; B01D 53/1475; B01D 53/1493; B01D 53/185; B01D 2251/2021
USPC ........................................................ 252/373
See application file for complete search history.

(56) References Cited

U.S. PATENT DOCUMENTS

2015/0005564 A1\* 1/2015 Tanna ................ B01D 53/1406
96/242
2016/0311682 A1 10/2016 Turk et al.

OTHER PUBLICATIONS

International Search Report and Written Opinion for corresponding PCT/EP2018/025312, dated Apr. 25, 2019.

\* cited by examiner

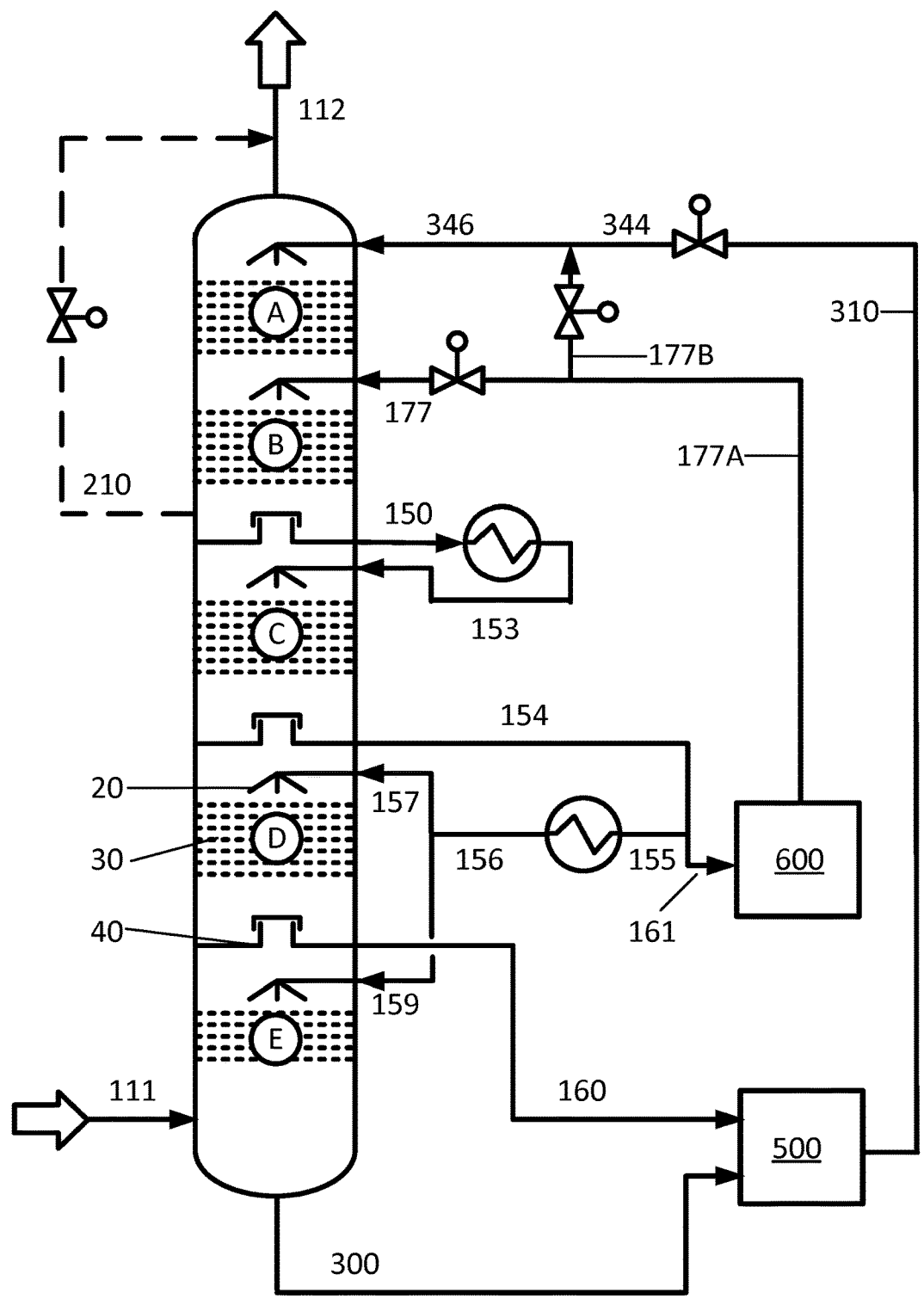

US 11,634,325 B2

ABSORBER COLUMN AND PROCESS FOR CLEANING CRUDE SYNTHESIS GAS

CROSS REFERENCE TO RELATED APPLICATIONS

This application is a 371 of International Application No. PCT/EP2018/025312, filed Dec. 10, 2018, which claims priority to European Patent Application No. 17300071.1, filed Dec. 22, 2017, the entire contents of which are incorporated herein by reference.

BACKGROUND

Field of the Invention

The invention relates to an absorber column and to the use thereof for separation of unwanted, especially acidic, gas constituents, for example carbon dioxide and hydrogen sulfide, from a crude synthesis gas by absorption with an absorbent, especially under low load states of the absorber column in relation to the synthesis gas velocity. The invention further relates to a process for producing a carbon dioxide-containing clean synthesis gas suitable for methanol synthesis, for example, from a crude synthesis gas using the absorber column of the invention.

State of the Art

Processes for separating unwanted accompanying substances from industrial crude gases by means of physical or chemical absorption or gas scrubbing are well-known from the prior art. For instance, such processes can reliably remove unwanted, acidic constituents from crude synthesis gases produced by gasification or reforming of carbonaceous feedstocks, for example carbon dioxide ($CO_2$) and hydrogen sulfide ($H_2S$), but also further constituents such as carbonyl sulfide (COS) and hydrogen cyanide (HCN), from the desirable synthesis gas constituents of hydrogen ($H_2$) and carbon monoxide (CO) down to the trace range. A known and frequently employed process is the Rectisol process, which is described in principle in Ullmann's Encyclopedia of Industrial Chemistry, 6th ed., vol. 15, p. 399 ff. In the Rectisol process, the abovementioned unwanted destructive components are absorbed by cold methanol, i.e. methanol cooled significantly below ambient temperature, as absorbent or scrubbing agent, with intensive mass transfer in an absorber column between the crude gas and the scrubbing agent or absorbent. This significantly increases the solubility of the unwanted gas constituents with falling methanol temperature and increasing pressure, while it remains virtually constant for hydrogen and carbon monoxide. Methanol additionally has the advantage of still having low viscosity even at temperatures down to −75° C. and hence of having good mass transfer and heat transfer properties.

In the Rectisol process, the methanol laden with the destructive components which is used as absorbent is circulated via regeneration apparatuses. In the regeneration apparatuses, the laden methanol is freed of the absorbed gases by a physical route. This involves removing $CO_2$ in a first regeneration step by expansion (called flash regeneration) and/or stripping with a gas, for example nitrogen, from the laden methanol absorbent. In a further or alternative regeneration step, the sulfur-containing gases, COS and $H_2S$, are driven out by heating (called hot regeneration). The aim is frequently to produce a very substantially $CO_2$-free COS/$H_2S$ gas since the further processing thereof in a manner of economic interest is impaired by mixing with $CO_2$.

In the Rectisol process, a distinction is made between the standard process and the selective Rectisol process. In the standard Rectisol process, the accompanying COS/$H_2S$ gases and the $CO_2$ are removed together in one absorption step from the crude synthesis gas. By contrast, in what is called the selective Rectisol process, the sulfur-containing accompanying COS/$H_2S$ gases and the $CO_2$ are each separated from the crude synthesis gas in separate, successive absorption steps. This selective absorption is enabled by suitable adjustment of the process parameters, especially the quantitative ratio of absorbent and gas to be absorbed. The advantage of selective absorption is that the COS/$H_2S$ gas and the $CO_2$ gas, even in the absorption, are for the most part kept separate and only the relatively small portion has to be separated in the regeneration of the methanol. In this way, in addition, the recovery of the sulfur present with the aid of downstream processes, for example the Claus process, is enabled.

After passing through usually multiple regeneration steps, multiple substreams of the absorbent that has been freed of the disruptive components, i.e. conventionally the methanol in the Rectisol process, are recycled to the absorber column. The absorbent regenerated by hot regeneration has the highest purity and is therefore used for fine scrubbing or fine absorption of already prepurified synthesis gas; it thus constitutes the final scrubbing stage before the cleaned synthesis gas leaves the absorber column, typically at its upper end, as clean synthesis gas. The absorbent regenerated by flash regeneration has somewhat lower purity and is especially still partly laden with carbon dioxide. This absorbent is used in what is called the main $CO_2$ scrub which, from the perspective of the synthesis gas that passes through the absorber column, is arranged upstream of the fine scrubbing, i.e. typically below the fine scrubbing stage.

When the clean synthesis gas produced is to be used for a downstream methanol synthesis, complete removal of the carbon dioxide is not always desired. Instead, what is required is that the clean synthesis gas to be used as feed gas for the methanol synthesis still has a particular proportion of carbon dioxide, for example 2% by volume. This requirement is taken into account by appropriate design of the absorber column, especially of the scrubbing stages in the part of the column which is selective for the $CO_2$ separation, typically the upper part of the column. However, such configurations proceed from standard conditions, particularly in respect of the flow rates of the synthesis gas and the absorbent involved. If the crude synthesis gas supplied to the absorber column is reduced, for example as a result of a multistream synthesis gas production by gasification or reforming in which individual production stages are shut down, the absorbent supply cannot be reduced to the same degree since there would otherwise be a departure from the hydraulically stable operating range of the absorber column. In that case, the effect of the absorbent feed which is thus too high for the reduced gas throughput is excessive separation of the carbon dioxide with regard to the content desired for the methanol synthesis. As a solution to this problem, a bypass conduit has been proposed, with which a proportion of the synthesis gas is guided past the $CO_2$ scrubbing stages after passing through the column region which is selective for the separation of sulfur components, such that the $CO_2$ concentration in the clean synthesis gas can be set correspondingly. However, a disadvantage here is the large dimensions of the pipelines and fittings required owing to the guiding of a gas flow, for example of the valves used. There is therefore a need for an alternative for establishment of a defined $CO_2$ concentration in the clean synthesis gas by means of lower complexity, especially in the case at states of low or partial load of the absorber column with regard to the crude synthesis gas supplied.

SUMMARY

The problem addressed by the invention is therefore that of providing an absorber column, the use thereof, and a process for producing a carbon dioxide-containing clean synthesis gas having a defined carbon dioxide content from a crude synthesis gas that offers the alternative mentioned above. This problem is solved essentially by an absorber column having the features of claim 1, by the use thereof for production of a carbon dioxide-containing clean synthesis gas having a defined carbon dioxide content from a crude synthesis gas according to claim 6 et seq. and by the process according to claim 8 et seq. Further configurations, especially preferred configurations, of the absorber column, the use thereof and the process can be found in the respective dependent claims.

Absorber Column of the Invention

Absorber column for production of a clean synthesis gas by at least partial separation of carbon dioxide and sulfur compounds, especially hydrogen sulfide, from a crude synthesis gas comprising hydrogen, carbon oxides and sulfur compounds, by absorbing with an absorbent, wherein the absorber column comprises the following constituents and assemblies:

a shell which—based on a state of the absorber column arranged as intended—extends along a longitudinal axis that runs parallel to the vertical and encloses an inner space, wherein the inner space comprises an upper absorption region and a lower absorption region, each of which contains at least one mass transfer zone, wherein the mass transfer zones of the upper absorption region serve predominantly for removal of carbon dioxide and wherein the mass transfer zones of the lower absorption region serve predominantly for removal of sulfur compounds, an inlet disposed below the lowermost mass transfer zone of the lower absorption region for the crude synthesis gas, an outlet disposed at the top end of the shell for the clean synthesis gas, an outlet disposed at the lower end of the upper absorption region for a first fraction of the laden absorbent laden with carbon dioxide, a first regeneration apparatus for the regeneration of the first fraction of the laden absorbent by expansion (flash regeneration), an outlet disposed at the bottom end of the shell for a second fraction of the laden absorbent laden with sulfur compounds, a second regeneration apparatus for the regeneration of the second fraction of the laden absorbent by heating (hot regeneration), a first absorbent inlet disposed above the uppermost mass transfer zone of the upper absorption region for the absorbent regenerated by heating, which is in fluid connection with the second regeneration apparatus via a first feed conduit, a second absorbent inlet disposed below the first absorbent inlet and within the upper absorption region for the absorbent regenerated by expansion, which is in fluid connection with the first regeneration apparatus via a second feed conduit, a connecting conduit between the first feed conduit and the second feed conduit.

Process of the Invention

Process for producing a clean synthesis gas with a defined carbon dioxide content from a crude synthesis gas, comprising the following process steps:

providing an absorber column according to claims 1 to 5, providing and introducing the crude synthesis gas into the absorber column, discharging the clean synthesis gas that has been at least partly freed of carbon dioxide and sulfur compounds and has a defined carbon dioxide content from the absorber column, discharging a first fraction of the laden absorbent laden with carbon dioxide, introducing the first fraction of the laden absorbent into a first regeneration apparatus for the regeneration by expansion (flash regeneration), conducting the regeneration by expansion, discharging the absorbent regenerated by expansion, discharging a second fraction of the laden absorbent laden with sulfur compounds, introducing the second fraction of the laden absorbent into a second regeneration apparatus for regeneration by heating (hot regeneration), conducting regeneration by heating, discharging the absorbent regenerated by heating, introducing the absorbent regenerated by heating into the absorber column above the first absorbent inlet, introducing the absorbent regenerated by expansion into the absorber column via the second absorbent inlet.

feeding at least a portion of the absorbent regenerated by expansion into the absorbent regenerated by heating prior to introduction thereof into the absorber column.

"Absorption region" is understood to mean a spatially divided or divisible region or section of the absorber column constructed in such a way that significant mass transfer from the gas phase into the liquid absorbent with regard to the constituents of the synthesis gas to be removed is possible therein. For this purpose, the absorption region comprises one or more mass transfer zones. These are configured in such a way that increasing the size of the interface between the gas and the liquid absorbent intensifies the mass transfer between the two phases. Mass transfer zones of this kind are therefore typically configured by means of trays, for example by means of valve trays or bubble-cap trays, or by means of structured packings. Combinations of these configurations are also possible.

Fluid connection between two regions is understood to mean any kind of connection that enables flow of a fluid, for example the liquid absorbent, from one to the other of the two regions, regardless of any intervening regions, components, fittings or devices.

Pressure figures in the unit bar(a) relate to the absolute pressure in bar, absolute.

The invention is based on the finding that a defined concentration of carbon dioxide in the clean synthesis gas can be brought about by mixing a defined proportion of the absorbent regenerated by expansion into the absorbent regenerated by heating, the $CO_2$ concentration of which is too small owing to the hot regeneration, in order to establish the desired concentration of carbon dioxide in the clean synthesis gas prior to introduction thereof into the absorber column via the first absorbent inlet disposed above the uppermost mass transfer zone of the upper absorption region that serves for the final purification of the synthesis gas. For this purpose, a connecting conduit is required between the first and second feed conduits, with a controller valve preferably also disposed in this conduit pathway and serving for fine adjustment of the absorbent flow from the second feed conduit (feed conduit for the absorbent regenerated by expansion) into the first feed conduit (feed conduit for the absorbent regenerated by heating). It has been found that the conduits and fittings required for the purpose are smaller and less prone to faults than those that are required for the switching of a bypass around the $CO_2$ absorption stages. Moreover, the concentration of carbon dioxide in the clean synthesis gas is more finely adjustable in the inventive manner than in the case of use of the bypass connection.

Preferred Configurations of the Invention

A preferred configuration of the absorber column of the invention is characterized in that the connecting conduit comprises a controller valve. This configuration enables precise control of the inflow of the absorbent regenerated by expansion from the second feed conduit into the first feed conduit, and hence precise adjustment of the carbon dioxide content in the clean synthesis gas.

It has been found to be particularly advantageous when the first feed conduit and/or the second feed conduit comprise(s) a controller valve. This configuration of the absorber column enables further degrees of freedom in the establishment of the carbon dioxide content in the clean synthesis gas and of the flow rate of the absorbent introduced into the absorber column.

In a preferred configuration of the absorber column, it further comprises a separation tray which is passable to gases flowing upward but impassable to liquids flowing downward and is disposed below the upper mass transfer zone and above the lower mass transfer zone. In this way, the carbon dioxide-laden absorbent can be collected and discharged from the absorber column in order to feed a fraction to the first regeneration apparatus and to introduce the remaining fraction, after cooling, back into the absorber column, for example into the lower mass transfer zone. A particularly suitable type of separation trays here has been found to be chimney trays.

In a development of the invention, the absorber column of the invention is in fluid connection with a plant for catalytic methanol synthesis from synthesis gas. Since the absorber column of the invention can be used to very accurately adjust the composition of the clean synthesis gas with regard to the carbon dioxide content thereof in the case of operation of the column at partial load as well, it has particular advantages in the case of connection with a plant that follows downstream for catalytic methanol synthesis. In this way, during the operation of the integrated plant system composed of absorber column and plant for catalytic methanol synthesis as well, the $CO_2$ concentration in the methanol synthesis gas can be altered in order to react, for example, to the deactivation of the synthesis catalysts used.

The invention also relates to the use of the absorber column of the invention for production of a carbon dioxide-containing clean synthesis gas from a crude synthesis gas. Preferably, this clean synthesis gas can be used as feedstock in the methanol synthesis. The use of the absorber column of the invention thus allows precise adjustment of the required concentration of carbon dioxide in the methanol synthesis gas. This is also true in a preferred use under low load states of the absorber column, i.e. operating states with lower velocity of crude synthesis gas than in normal operation. It is also possible to use such a clean synthesis gas having a defined carbon dioxide content as feedstock in other chemical syntheses, for example in the production of synthetic natural gas (SNG) or in Fischer-Tropsch synthesis.

A preferred configuration of the process of the invention for production of a carbon dioxide-containing clean synthesis gas with a defined carbon dioxide content from a crude synthesis gas is characterized in that the absorber column is in a state of operation in which the flow rate of the crude synthesis gas is reduced compared to normal operation. In this state of operation, owing to the excess of the absorbent in relation to the now-reduced gas velocity, the removal of carbon dioxide from the synthesis gas is too far-reaching, and so the $CO_2$ concentration goes below that required for the methanol synthesis. The inventive feeding of partly $CO_2$-laden absorbent coming from the flash regeneration to the largely $CO_2$-free absorbent (fine absorbent) coming from the hot regeneration can raise the $CO_2$ concentration in the clean synthesis gas back to the value required. Thus, the required carbon dioxide concentration in the methanol synthesis gas can be precisely adjusted.

A particularly preferred configuration of the process of the invention is characterized in that the absorber column is in a state of operation in which the flow rate of the crude synthesis gas is reduced compared to standard operation to such an extent that the absorber column is close to the lower limit of its hydraulic working range. This is defined in that, owing to the low gas velocity, there is unwanted passage, called weeping, of absorbent from one tray to a tray beneath. In this state of operation, owing to the large excess of the absorbent in relation to the gas velocity that has been reduced still further compared to the prior configuration, the removal of carbon dioxide from the synthesis gas is even more far-reaching, such that the $CO_2$ concentration goes well below that required for the methanol synthesis. Here too, the inventive supply of partly $CO_2$-laden absorbent coming from the flash regeneration to the largely $CO_2$-free absorbent (fine absorbent) coming from the hot regeneration can raise the $CO_2$ concentration in the clean synthesis gas back to the value required. Thus, the required carbon dioxide concentration in the methanol synthesis gas can be precisely adjusted in this case of operation too.

A further particularly preferred configuration of the process of the invention is characterized in that the absorber column is in a state of operation in which the flow rate of the crude synthesis gas is reduced to 70% or less, preferably 40% or less, compared to that in standard operation. A reduction in the flow rate of the crude synthesis gas to 40% or less results in a state of operation of the absorber column which, as experience has shown, is at the lower limit of its hydraulic working range. Therefore, the remarks in the discussion of the previous configuration of the process of the invention are applicable. Furthermore, however, even at gas velocities of 70% or less compared to standard operation of the absorber column, a distinct reduction in the $CO_2$ concentration in the clean synthesis gas below the value required is observed, and so, even here, the inventive supply of partly $CO_2$-laden absorbent coming from the flash regeneration to the largely $CO_2$-free absorbent (fine scrubbing agent) coming from the hot regeneration can raise the $CO_2$ concentration in the clean synthesis gas back to the value required.

In a further aspect of the process of the invention, the ratio of the flow rates of the regenerated absorbent that flows through the connecting conduit to that which flows through the first feed conduit is between 5% and 60% by weight, preferably between 10% and 40% by weight. Taking account of these ratios, it is ensured that the $CO_2$ concentration in the clean synthesis gas can be set within the concentration ranges desired.

A further particular configuration of the process of the invention is characterized in that the ratio of the flow rates of regenerated absorbent that flows through the connecting conduit compared to that which flows through the first feed conduit is adjusted such that the molar proportion of carbon dioxide in the clean synthesis gas fed to a methanol synthesis is at least 1 mol %, preferably at least 2 mol %. Appropriate setting of these flow rate ratios ensures that the $CO_2$ concentration in the clean synthesis gas can be set within the concentration ranges desired for the methanol synthesis.

A further particular configuration of the process of the invention is characterized in that the temperature of the absorbent regenerated by expansion that flows through the connecting conduit, prior to introduction into the first feed conduit, is between −70° C. and −10° C., preferably between −60° C. and −30° C. These temperatures are achieved by the adiabatic desorption on expansion without additional cooling of the absorbent in cooling apparatuses. The absorbent that has been cooled in this way is usable directly in the absorber column and has favourable absorption properties.

Preferably, the absorbent regenerated by expansion is taken from a reabsorption apparatus or a medium-pressure flash apparatus which is operated typically at 10 to 30 bar(a), preferably at 15 to 25 bar(a). Alternatively, the absorbent regenerated by expansion can also be taken from a low-pressure flash apparatus which is operated typically at 1 to 3 bar(a), preferably at 1 to 2 bar(a). The expansion is often conducted in multiple stages in multiple separate apparatuses, in which case the absorbent discharged from the moderate-pressure flash apparatus after expansion has a residual carbon dioxide loading that makes it suitable for the use of the invention. The same applies to the absorbent obtained from a reabsorption apparatus. In the selective Rectisol process, for example, this constitutes an apparatus part connected downstream of the stripping apparatus and serves for reabsorption of the sulfur compounds that have been stripped out in an unwanted manner.

In a particularly preferred configuration of the process of the invention, the absorbent comprises one or more components selected from the following group: methanol, N-methylpyrrolidone (NMP), secondary amines, preferably diethanolamine, tertiary amines, preferably methyldiethanolamine, polyethylene glycol dialkyl ethers, preferably polyethylene glycol dimethyl ether. All these absorbents serve for absorption of carbon dioxide and sulfur compounds, and can be regenerated by means of expansion or hot regeneration.

BRIEF DESCRIPTION OF THE DRAWING

Further features, advantages and possible uses of the invention are also apparent from the description of a working example and numerical example which follows and from the drawing. AH the features described and/or visualized, on their own or in any combination, form the subject-matter of the invention, irrespective of their combination in the claims or their dependency references.

The sole FIGURE shows:

FIG. 1 a schematic diagram of an illustrative configuration of the absorber column of the invention.

DETAILED DESCRIPTION OF THE PREFERRED EMBODIMENTS

In the configuration of the process of the invention shown in schematic form in FIG. 1, here in the form of the Rectisol process, or of the absorber column of the invention, crude synthesis gas that has been produced by reforming or gasification of carbonaceous feeds in an upstream synthesis gas production plant which is not visualized is introduced into the absorber column 1 via conduit 111, The crude synthesis gas contains, as well as the desired synthesis gas constituents of hydrogen and carbon monoxide, among other substances, also the unwanted acidic synthesis gas constituents carbon dioxide and hydrogen sulfide, and further organic and inorganic sulfur compounds.

The crude synthesis gas introduced into the absorber column flows upward therein and passes through multiple mass transfer zones 30 and separation trays 40 that are permeable to the gas flow and, in the example shown, are configured as chimney trays. (The reference numerals 20, 30, 40 are introduced in a merely illustrative manner for a column region comprising liquid distributor 20, mass transfer zone 30 and separation trays 40.) The mass transfer zones have been configured either with trays, for example bubble-cap trays, or as structured packings. Combinations of the two configuration forms are also possible. Once the crude synthesis gas has passed through all the mass transfer zones and the unwanted constituents, especially carbon dioxide and hydrogen sulfide, have been separated out therein by mass transfer with the absorbent, methanol in the present example, it leaves the absorber column as clean synthesis gas via conduit 112.

The mass transfer zones present in the absorber column have the following tasks and properties:

Mass transfer zone A: $CO_2$ fine scrubbing. Fine removal of carbon dioxide down to the residual content required. Contacting with hot-regenerated methanol via conduits 310, 344, 346 (first feed conduit).

Mass transfer zone B: $CO_2$ main scrubbing. Removal of carbon dioxide. Contacting with methanol regenerated (flash-regenerated) by expansion via conduits 177A, 177 (second feed conduit).

Mass transfer zone C: Cooling stage, Removal of the heat of absorption released in mass transfer zones D and E to increase the absorption capacity of the absorbent.

Mass transfer zone D: $H_2S$ absorption. Removal of carbon dioxide. Contacting with methanol which is discharged from the separation tray of mass transfer zone C via conduit 154, cooled down and recycled to the absorber column via conduit 156, 157.

Mass transfer zone E: Preliminary scrubbing. Removal of HCN, $NH_3$ and other trace components. Contacting with methanol which has been discharged from the separation tray of mass transfer zone C via conduit 154, optionally cooled down and recycled to the absorber column via conduit 156, 159.

It is also possible to divide the absorber column described into two individual columns between mass transfer zones A-B and D-E, of which the column comprising mass transfer zones A-B serves for $CO_2$ absorption and the column comprising mass transfer zones D-E for $H_2S$ absorption. Such a divided column shall also be regarded as an absorber column in the context of the present invention.

That fraction of the methanol which is discharged from the separation tray of mass transfer zone C via conduit 154 and has not been recycled to mass transfer zones D and E via conduits 156, 157 or 156, 159 is guided via conduit 161 to the flash regeneration apparatus 600 (first regeneration apparatus) and introduced into it. Via conduit 177A, the absorbent regenerated by flashing is guided to conduit 177, the second feed conduit, and recycled via the latter to mass transfer zone B.

The bottom product from the absorber column, i.e. the methanol stream laden with sulfur components, is discharged from the absorber column via conduits 300 and 160, guided to the hot regeneration apparatus 500 (second regeneration apparatus) and introduced into it. Via conduits 310 and 344, the methanol regenerated by heating is recycled to conduit 346, the first feed conduit, and recycled via the latter to mass transfer zone A.

The conduit 177B provided in accordance with the invention and the controller valve present in the conduit pathway enable the setting of a defined inflow of the methanol regenerated by flashing to the methanol stream regenerated by hot regeneration. This allows fine adjustment of the carbon dioxide concentration in the clean synthesis gas. This is advantageous especially when the absorber column is in a state of operation in which the flow rate of the crude synthesis gas has been reduced to 70% or less, preferably 40% or less, compared to that in standard operation. A reduction in the flow rate of the crude synthesis gas to 40% or less results in a state of operation of the absorber column which, as experience has shown, is at the lower limit of its hydraulic working range. Furthermore, however, even at gas velocities of 70% or less compared to standard operation of the absorber column, a distinct reduction in the $CO_2$ concentration in the clean synthesis gas below the value required is observed, and so, even here, the inventive supply of partly $CO_2$-laden absorbent coming from the flash regeneration to the largely $CO_2$-free absorbent (fine scrubbing agent) coming from the hot regeneration can raise the $CO_2$ concentration in the clean synthesis gas back to the value required.

The flow rate ratio of the regenerated methanol that flows through the connecting conduit 177B to that which flows through conduit 344 which opens into the first feed conduit 346 is adjusted to values between 5% and 60% by weight, preferably between 10% and 40% by weight. Taking account of these ratios, it is ensured that the $CO_2$ concentration in the clean synthesis gas can be set within the concentration ranges desired. It is generally the case that the ratio of the flow rates of regenerated absorbent that flows through the connecting conduit to that which flows through the first feed conduit is adjusted such that the molar proportion of carbon dioxide in the cleaned synthesis gas fed to the methanol synthesis is at least 1 mol %, preferably at least 2 mol %. Appropriate setting of these flow rate ratios ensures that the $CO_2$ concentration in the clean synthesis gas can be set within the concentration ranges desired and the synthesis gas obtained is suitable for use in methanol synthesis.

The temperature of the methanol regenerated by flashing that flows through the connecting conduit 177B, prior to introduction into the first feed conduit 346, is between $-70°$ C. and $-10°$ C., preferably between $-60°$ C. and $-30°$ C. These temperatures are attained by the adiabatic desorption on expansion without additional cooling of the methanol in cooling apparatuses. The methanol cooled in this way is usable directly in the absorber column and has favourable absorption properties.

FIG. 1 also shows, for comparison, the existing noninventive procedure for establishment of the carbon dioxide concentration in the clean synthesis gas by means of the conduit 210 shown as a dotted line and the controller valve present in this conduit pathway. However, a disadvantage is the large dimensions of the pipeline 210 and of the valve that are required owing to the guiding of a gas flow. Experience has shown that the latter is also more prone to faults than the liquid controller valve of the invention in the conduit pathway 177B.

The devices for hot regeneration 500 or flash regeneration 600 shown in FIG. 1 are represented merely schematically as function blocks. Their exact configuration is known per se to those skilled in the art. More particularly, the apparatus for flash regeneration 600 may comprise multiple expansion stages or apparatus components at different pressure levels, including a moderate-pressure flash apparatus.

The tables reproduced below give the most important physical parameters and the compositions (mole fractions) for the entry and exit streams designated in FIG. 1 for each of three operating states of the absorber column according to the above-discussed working example (Rectisol process):

Standard load (comparative example): Operation of the absorber column with standard values (design values) for gas and liquid velocity.

Low load (comparative example): Operation of the absorber column at standard values for liquid velocity, but greatly reduced gas velocity at the lower end of the hydraulic working range.

Invention: Operation of the absorber column at standard values for liquid velocity and greatly reduced gas velocity, but with feeding of the methanol regenerated by flashing via conduit 177B to the methanol stream regenerated by hot regeneration and introduced via conduits 310 and 344. There is a clearly apparent rise in the $CO_2$ concentration from zero (comparative example) to about 3.9 mol % (invention) in the first feed conduit 346 and from 0.4 to about 2.0 mol % in the clean synthesis gas in conduit 112.

INDUSTRIAL APPLICABILITY

The invention provides an improvement of proven processes for cleaning crude synthesis gas in absorber columns that enables reliable and efficient establishment of a defined $CO_2$ concentration in the clean synthesis gas, especially also at low gas velocity of the column.

LIST OF REFERENCE NUMERALS

1 absorber column
20 liquid distributor
30 mass transfer zone
40 separation tray, e.g. chimney tray
111 conduit (crude synthesis gas)
112 conduit (clean synthesis gas)
150 conduit
153-157 conduit
159-161 conduit
177, 177A, 177B conduit
210 conduit (bypass)
300, 310 conduit
344, 346 conduit
500 hot regeneration apparatus
600 flash regeneration apparatus

| Stream No. Description | | Low load 111 Crude syngas to absorber | Invention 111 Crude syngas to absorber | Standard load 111 Crude syngas to absorber | Low load 112 Clean syngas from absorber | Invention 112 Clean syngas from absorber | Standard load 112 Clean syngas from absorber |
|---|---|---|---|---|---|---|---|
| Total flow rate | kmol/hr | 6652 | 6644 | 24446 | 3997 | 4060 | 16725 |
| Temperature | °C. | −0.1 | −3.7 | −20.0 | −39.3 | −45.6 | −34.2 |
| Pressure | bar(a) | 62.3 | 62.3 | 55.6 | 61.2 | 61.2 | 54.5 |
| CO2 | | 0.3618 | 0.3611 | 0.3044 | 0.0041 | 0.0195 | 0.0295 |
| CO | | 0.1885 | 0.1886 | 0.2436 | 0.2919 | 0.2874 | 0.3407 |
| H2 | | 0.4256 | 0.4260 | 0.4289 | 0.6951 | 0.6843 | 0.6210 |
| N2 | | 0.0043 | 0.0043 | 0.0046 | 0.0068 | 0.0067 | 0.0066 |
| AR | | 0.0010 | 0.0010 | 0.0011 | 0.0015 | 0.0015 | 0.0015 |
| H2S | | 0.0162 | 0.0163 | 0.0153 | 0.0000 | 0.0000 | 0.0000 |
| COS | | 0.0003 | 0.0003 | 0.0005 | 0.0000 | 0.0000 | 0.0000 |
| H2O | | 0.0005 | 0.0005 | 0.0004 | 0.0000 | 0.0000 | 0.0000 |
| MEOH | | 0.0014 | 0.0015 | 0.0005 | 0.0001 | 0.0000 | 0.0001 |

| Stream No. Description | | Low load 344 Fine scrub MeOH to absorber | Invention 344 Fine scrub MeOH to absorber | Standard load 344 Fine scrub MeOH to absorber | Low load 346 Fine scrub MeOH to absorber | Invention 346 Fine scrub MeOH to absorber | Standard load 346 Fine scrub MeOH to absorber |
|---|---|---|---|---|---|---|---|
| Total flow rate | kmol/hr | 3629 | 3629 | 10712 | 3623 | 4869 | 10703 |
| Temperature | °C. | −42.2 | −42.0 | −45.7 | −42.2 | −46.0 | −45.7 |
| Pressure | bar(a) | 74.7 | 74.7 | 67.8 | 66.9 | 64.5 | 60.0 |
| CO2 | | 0.0000 | 0.0000 | 0.0000 | 0.0000 | 0.0391 | 0.0000 |
| CO | | 0.0000 | 0.0000 | 0.0000 | 0.0000 | 0.0000 | 0.0000 |
| H2 | | 0.0000 | 0.0000 | 0.0000 | 0.0000 | 0.0000 | 0.0000 |
| N2 | | 0.0000 | 0.0000 | 0.0000 | 0.0000 | 0.0000 | 0.0000 |
| AR | | 0.0000 | 0.0000 | 0.0000 | 0.0000 | 0.0000 | 0.0000 |
| H2S | | 0.0000 | 0.0000 | 0.0000 | 0.0000 | 0.0000 | 0.0000 |
| COS | | 0.0000 | 0.0000 | 0.0000 | 0.0000 | 0.0000 | 0.0000 |
| H2O | | 0.0051 | 0.0051 | 0.0149 | 0.0051 | 0.0049 | 0.0149 |
| MEOH | | 0.9949 | 0.9949 | 0.9850 | 0.9949 | 0.9559 | 0.9850 |

| Stream No. Description | | Low load 177 Main scrub MeOH to absorber | Invention 177 Main scrub MeOH to absorber | Standard load 177 Main scrub MeOH to absorber | Low load 177A Main scrub MeOH to absorber | Invention 177A Main scrub MeOH to absorber | Standard load 177A Main scrub MeOH to absorber | Low load 177B Main scrub MeOH to fine scrub | Invention 177B Main scrub MeOH to fine scrub | Standard load 177B Main scrub MeOH to fine scrub |
|---|---|---|---|---|---|---|---|---|---|---|
| Total flow rate | kmol/hr | 6268 | 4984 | 14984 | 6268 | 6231 | 14984 | | 1246 | |
| Temperature | °C. | −57.4 | −57.1 | −60.2 | −57.4 | −57.1 | −60.2 | | −57.1 | |
| Pressure | bar(a) | 64.5 | 64.5 | 60.3 | 72.0 | 72.0 | 68.0 | | 64.5 | |
| CO2 | | 0.1560 | 0.1531 | 0.1796 | 0.1560 | 0.1531 | 0.1796 | | 0.1531 | |
| CO | | 0.0000 | 0.0000 | 0.0000 | 0.0000 | 0.0000 | 0.0000 | | 0.0000 | |
| H2 | | 0.0000 | 0.0000 | 0.0000 | 0.0000 | 0.0000 | 0.0000 | | 0.0000 | |
| N2 | | 0.0000 | 0.0000 | 0.0000 | 0.0000 | 0.0000 | 0.0000 | | 0.0000 | |
| AR | | 0.0000 | 0.0000 | 0.0000 | 0.0000 | 0.0000 | 0.0000 | | 0.0000 | |
| H2S | | 0.0000 | 0.0000 | 0.0000 | 0.0000 | 0.0000 | 0.0000 | | 0.0000 | |
| COS | | 0.0000 | 0.0000 | 0.0000 | 0.0000 | 0.0000 | 0.0000 | | 0.0000 | |
| H2O | | 0.0043 | 0.0043 | 0.0122 | 0.0043 | 0.0043 | 0.0122 | | 0.0043 | |
| MEOH | | 0.8397 | 0.8426 | 0.8081 | 0.8397 | 0.8426 | 0.8081 | | 0.8426 | |

| Stream No. Description | | Low load 160 H2S-laden MeOH to hot reg. | Invention 160 H2S-laden MeOH to hot reg | Standard load 160 H2S-laden MeOH to hot reg | Low load 161 CO2-laden MeOH to flash reg. | Invention 161 CO2-laden MeOH to flash reg. | Standard load 161 CO2-laden MeOH to flash reg. | Low load 300 Prescrub MeOH to hot reg. | Invention 300 Prescrub MeOH to hot reg. | Standard load 300 Prescrub MeOH to hot reg. |
|---|---|---|---|---|---|---|---|---|---|---|
| Total flow rate | kmol/hr | 181 | 181 | 318 | 9031 | 8909 | 23568 | 191 | 204 | 388 |
| Temperature | °C. | −40.0 | −40.0 | −40.0 | −16.9 | −16.8 | −23.6 | −3.1 | −6.6 | −20.7 |
| Pressure | bar(a) | 64.2 | 64.2 | 56.6 | 63.4 | 63.4 | 56.7 | 22.3 | 22.3 | 22.3 |
| CO2 | | 0.2538 | 0.2453 | 0.2804 | 0.2538 | 0.2453 | 0.2804 | 0.2275 | 0.2518 | 0.3111 |
| CO | | 0.0070 | 0.0070 | 0.0077 | 0.0070 | 0.0070 | 0.0077 | 0.0054 | 0.0057 | 0.0070 |
| H2 | | 0.0041 | 0.0041 | 0.0029 | 0.0041 | 0.0041 | 0.0029 | 0.0041 | 0.0040 | 0.0026 |
| N2 | | 0.0001 | 0.0001 | 0.0001 | 0.0001 | 0.0001 | 0.0001 | 0.0001 | 0.0001 | 0.0001 |
| AR | | 0.0000 | 0.0000 | 0.0000 | 0.0000 | 0.0000 | 0.0000 | 0.0000 | 0.0000 | 0.0000 |
| H2S | | 0.0000 | 0.0000 | 0.0000 | 0.0000 | 0.0000 | 0.0000 | 0.0381 | 0.0421 | 0.0568 |
| COS | | 0.0000 | 0.0000 | 0.0000 | 0.0000 | 0.0000 | 0.0000 | 0.0006 | 0.0006 | 0.0014 |
| H2O | | 0.0038 | 0.0038 | 0.0106 | 0.0038 | 0.0038 | 0.0106 | 0.0220 | 0.0207 | 0.0347 |
| MEOH | | 0.7310 | 0.7396 | 0.6982 | 0.7310 | 0.7396 | 0.6982 | 0.7018 | 0.6745 | 0.5790 |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An absorber column for production of a clean synthesis gas by at least partial separation of carbon dioxide and sulfur compound from a crude synthesis gas comprising hydrogen, carbon oxides and sulfur compounds, by absorbing with an absorbent, the absorber column comprising:
   a shell which extends along a longitudinal axis that runs parallel to the vertical and encloses an inner space, wherein the inner space comprises an upper absorption region and a lower absorption region, each of which contains at least one mass transfer zone, wherein the mass transfer zones of the upper absorption region serve predominantly for removal of carbon dioxide and wherein the mass transfer zones of the lower absorption region serve predominantly for removal of sulfur compounds,
   an inlet disposed below the lowermost mass transfer zone of the lower absorption region for the crude synthesis gas,
   a clean synthesis gas outlet disposed at the top end of the shell for the clean synthesis gas,
   a first outlet disposed at the lower end of the upper absorption region for a first fraction of the laden absorbent laden with carbon dioxide,
   a first regeneration apparatus for the regeneration of the first fraction of the laden absorbent by expansion,
   a second outlet disposed at the bottom end of the shell for a second fraction of the laden absorbent laden with sulfur compounds,
   a second regeneration apparatus for the regeneration of the second fraction of the laden absorbent by heating,
   a first absorbent inlet disposed above the uppermost mass transfer zone of the upper absorption region for the absorbent regenerated by heating, which is in fluid connection with the second regeneration apparatus via a first feed conduit,
   a second absorbent inlet disposed below the first absorbent inlet and within the upper absorption region for the absorbent regenerated by expansion, which is in fluid connection with the first regeneration apparatus via a second feed conduit, and
   a connecting conduit between the first feed conduit and the second feed conduit.

2. The absorber column of claim 1, wherein the connecting conduit comprises a controller valve.

3. The absorber column of claim 1, wherein the first feed conduit and/or the second feed conduit comprise(s) a controller valve.

4. The absorber column of claim 1, further comprising a separating tray, which is passable to gases flowing upward but impassable to liquids flowing downward and which is disposed below the upper mass transfer zone and above the lower mass transfer zone.

5. The absorber column of claim 1, in fluid connection to a plant for catalytic methanol synthesis from synthesis gas.

6. A process for producing a clean synthesis gas with a defined carbon dioxide content from a crude synthesis gas, comprising:
   providing an absorber column according to claim 1,
   providing and introducing the crude synthesis gas into the absorber column,
   discharging the clean synthesis gas that has been at least partly freed of carbon dioxide and sulfur compounds and has a defined carbon dioxide content from the absorber column,
   discharging a first fraction of the laden absorbent laden with carbon dioxide from the first outlet,
   introducing the first fraction of the laden absorbent into a first regeneration apparatus for the regeneration by expansion (flash regeneration), conducting the regeneration by expansion, discharging the absorbent regenerated by expansion,
   discharging a second fraction of the laden absorbent laden with sulfur compounds from the second outlet,
   introducing the second fraction of the laden absorbent into a second regeneration apparatus for regeneration by heating, conducting regeneration by heating, discharging the absorbent regenerated by heating,
   introducing the absorbent regenerated by heating into the absorber column via the first absorbent inlet,
   introducing the absorbent regenerated by expansion into the absorber column via the second absorbent inlet, and feeding via the connecting conduit at least a portion of the absorbent regenerated by expansion into the absorbent regenerated by heating prior to introduction thereof into the absorber column.

7. The process of claim 6, wherein the ratio of the flow rate of the regenerated absorbent that flows through the connecting conduit to that which flows through the first feed conduit is between 5% and 60% by weight.

8. The process of claim 6, wherein the ratio of the flow rates of regenerated absorbent that flows through the connecting conduit compared to that which flows through the first feed conduit is adjusted such that the molar proportion of carbon dioxide in the cleaned synthesis gas fed to a methanol synthesis is at least 1 mol %.

9. The process of claim 6, wherein the temperature of the absorbent regenerated by expansion that flows through the connecting conduit, prior to introduction into the first feed conduit, is between −70° C. and −10° C.

10. The process of claim 6, wherein the absorbent regenerated by expansion is taken from a reabsorption apparatus, a medium-pressure flash apparatus or a low-pressure flash apparatus.

11. The process of claim 6, wherein the absorbent comprises one or more components selected from the following group: methanol, N-methylpyrrolidone (NMP), secondary amines, diethanolamine, tertiary amines, methyldiethanolamine, polyethylene glycol dialkyl ethers, and polyethylene glycol dimethyl ether.

* * * * *